United States Patent Office 3,465,020
Patented Sept. 2, 1969

3,465,020
HETEROCYCLIC SILICON COMPOUNDS
Cecil L. Frye, Midland, Mich., assignor to Dow Corning Corporation, Midland, Mich., a corporation of Michigan
No Drawing. Filed Aug. 21, 1967, Ser. No. 661,819
Int. Cl. C07f 7/18
U.S. Cl. 260—448.8    12 Claims

ABSTRACT OF THE DISCLOSURE

This invention relates to a heterocyclic silicon compound selected from the group consisting of those having the general formulae (1) 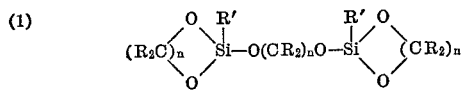

and (2) 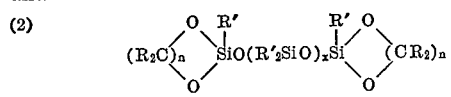

wherein

R is a hydrogen atom, a hydrocarbon radical, or a halohydrocarbon radical, at least two of the R radicals in each ring being hydrocarbon or halohydrocarbon radicals and every R being free of aliphatic unsaturation,
R' is a hydrocarbon radical or a halohydrocarbon radical,
$n$ has a value of from 2 to 5, and
$x$ is an integer, the novel compounds are useful as hydraulic fluids, lubricants, and insect repellents.

---

This invention relates to new heterocyclic compounds of the type shown above.

As stated above, R can be a hydrogen atom or any hydrocarbon or halohydrocarbon radical free of aliphatic unsaturation. Thus R can be, for example, an alkyl, cycloalkyl, aryl, alkaryl or an alkaryl radical, or the corresponding halogenated radicals. Specific examples of R include the methyl, ethyl, propyl, amyl, hexyl, heptyl, octyl, nonyl, decyl, dodecyl, cyclohexyl, phenyl xenyl, naphthyl, benzyl, tolyl, xylyl, chloromethyl, trifluoromethyl, bromopropyl, dichlorocyclohexyl and iodophenyl radicals. Preferably R contains from 1 to 6 carbon atoms. In addition at least two of the R radicals in each ring must be hydrocarbon or halohydrocarbon radicals. Preferably these radicals are located vicinally.

The R' radical can be any hydrocarbon or halohydrocarbon radical. Thus R' can be an alkyl, alkenyl, alkynyl, cycloalkyl, cycloalkenyl, aryl, alkaryl or an aralkyl radical, or the corresponding halogenated radicals. Specific examples of R' include the vinyl, allyl, hexenyl, propargyl, cyclohexenyl, dichlorophenyl, α,α,α-trifluorotolyl and the 3,3,3-trifluoropropyl radicals as well as those set forth for R, supra. Preferably R' contains from 1 to 6 carbon atoms.

In the above formulae $n$ can have a value of from 2 to 5 inclusive. Thus there can be from 5 to 8 members in the heterocyclic ring. The preferred compounds are those having 6 or 7 ring members, i.e. $n$ preferably has a value of from 3 to 4. When $n$ is 2 it is preferable that all of the R radicals be hydrocarbon or halohydrocarbon radicals.

In Formula 2 above $x$ can be any integer. Thus $x$ can have a value from zero to 10,000 or more. Preferably, however, $x$ has a value of from zero to about 1000.

The heterocyclic silicon compounds having Formula 1 can be prepared by heating a mixture of about 3 mols of an aliphatic diol of the formula $HO(R_2C)_nOH$ and about 2 mols of a silane of the formula $R'SiX_3$ in the presence of a suitable catalyst. In these formulas R, R' and $n$ have the heretofore defined meanings, while X is a hydroxyl radical or a hydrolyzable radical. Specific examples of X, in addition to the hydroxyl radical, include the halogen atoms, such as the chlorine, fluorine and bromine atoms; the alkoxy radicals such as the methoxy, ethoxy, propoxy and butoxy radicals; the acyloxy radicals such as the formyloxy, acetoxy and propionoxy radicals; the cellosolveoxy radicals such as the —OCH$_2$CH$_2$OCH$_3$ and —OCH$_2$CH$_2$OC$_2$H$_5$ radicals; the aryloxy radicals such as the phenoxy radical; the NH$_2$ radical; the hydrogen atom; and oxime radicals such as —O—N=C(CH$_3$)(C$_2$H$_5$) and

—O—N=C(CH$_3$)(C$_3$H$_7$).

In the preparation of the compounds of this invention it is preferable that X be a hydroxyl or an alkoxy radical.

The heterocyclic silicon compounds having Formula 1 can also be prepared by heating a mixture of about 3 mols of an aliphatic diol of the formula $HO(R_2C)_nOH$ and about 2 mols of

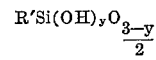

in the presence of a suitable catalyst. In these formulae R, R' and $n$ have the heretofore defined meanings and $y$ has a value of from 0 to 3.

Suitable catalysts for the above reactions include bases such as alkali metal alkoxides, alkali metal hydroxides, quaternary ammonium bases, and in some instances alcoholysis catalysts such a alkoxytitanate.

The heterocyclic silicon compounds having Formula 2 can be prepared by heating a mixture of about one mol of an aliphatic diol of the formula $HO(R_2C)_nOH$ and about one mol of a silane of the formula $R'SiX_3$ in the presence of a suitable catalyst as described above to obtain an intermediate product having the general formula

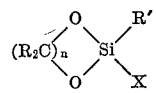

and then either condensing two mols of the resulting product with each other, or condensing about 2 mols of the resulting product with about one mol of a siloxane of the general formula $X(R'_2SiO)_xSiR'_2X$. The condensation is preferably carried out in the presence of one of the well-known catalysts used in the preparation of siloxanes by condensation methods.

The compounds of this invention are useful as hydraulic fluids, heat transfer fluids, lubricants, and in some instances insect repellents. Compounds of this invention which contain vicinal R radicals are of particular interest for some of the above utilities because they generally are more resistant to polymerization, i.e. they are generally more stable.

Now in order that those skilled in the art may better understand how the present invention can be practiced, the following examples are given by way of illustration and not by way of limitation.

Example 1

A mixture of 67.6 g. of propyltrimethoxysilane, 87.6 g. of 2-ethylhexane 1,3-diol and 0.05 g. of sodium methoxide was heated to 260° C. during a 2 to 3 hour period, distilling methanol from the system as it formed. The resulting mixture was fractionally distilled to obtain 103 g. of

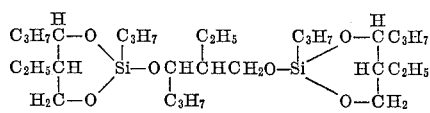

over a range of 180°–190° C. at 0.3 mm. of mercury pressure. The compound had a freezing point of −63° C. and a refractive indev of $n_D{}^{25}$ 1.4525. An infrared spectrum indicated no residual OH groups to be present. Elemental analysis of the compound showed 63.3% carbon, 11.05% hydrogen and 9.77% silicon as compared to theoretical values of 62.7% carbon, 10.85% hydrogen and 9.78% silicon.

Example 2

A mixture of 137.5 g. of methyltrimethoxysilane, 219.2 g. of 2-ethylhexane-1,3-diol and 0.1 g. of potassium hydroxide was heated to reflux during a 1¼ hour period, after which time methanol was distilled from the system over a 4 hour period. The resulting mixture was fractionally distilled to obtain 120 g. of

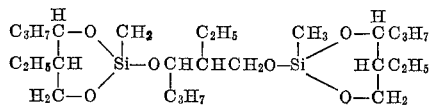

at 170° C. at 0.5 mm. of mercury pressure. The compound had a freezing point of −50° C. Elemental analysis of the compound showed 59.3% carbon, 10.3% hydrogen and 11.04% silicon as compared to theoretical values of 60.2% carbon, 10.4% hydrogen and 10.84% silicon.

Example 3

A mixture of 93.6 g. of n-amyltrimethoxysilane, 87.6 g. of 2-ethylhexane-1,3-diol and 0.3 g. of sodium methoxide was heated to 233° C. during a 9 hour period, distilling methanol from the system as it formed. The resulting mixture was fractionally distilled to obtain 56 g. of

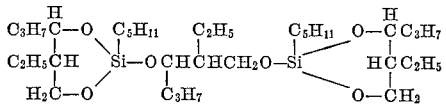

over a range of 175°–185° C. at 0.05 mm. of mercury pressure. The compound had a freezing point of −62° C. and a refractive index of $n_D{}^{25.4}$ 1.4550. Elemental analysis of the compound showed 65.3% carbon, 11.4% hydrogen and 8.94% silicon as compared to theoretical values of 64.8% carbon, 11.1% hydrogen and 8.92% silicon.

Example 4

A mixture of 39.6 g. of phenyltrimethoxysilane, 43.8 g. of 2-ethylhexane-1,3-diol and 0.3 g. of sodium methoxide was heated to 240° C. during a period of several hours, distilling methanol from the system as it formed. The resulting mixture was fractionally distilled to obtain 23 g. of

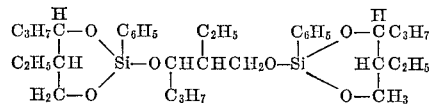

at 250° C. at 0.01 mm. of mercury pressure. The compound had a freezing point of −33° C. and a refractive index of $n_D{}^{24}$ 1.5022. Elemental analysis of the compound showed 66.9% carbon, 9.05% hydrogen and 9.46% silicon as compared to theoretical values of 67.2% carbon, 9.03% hydrogen and 8.75% silicon.

Example 5

A mixture of 164 g. of propyltrimethoxysilane, 146 g. of 2-ethylhexane-1,3-diol and 0.5 g. of sodium methoxide was heated to 150° C. during a period of hours, distilling methanol from the system as it formed. The resulting mixture was fractionally distilled to obtain 120 g. of

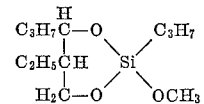

at 114° C. at 10 mm. of mercury pressure. The compound had a refractive index of $n_D{}^{25.8}$ 1.4339.

123 g. of the above prepared compound was heated to 150° C. for three hours with 4.5 g. of water after adding a small amount of powdered potassium hydroxide to serve as a catalyst. During this time 15 g. of methanol distilled from the reaction mixture. Subsequent distillation yielded 98 g. of

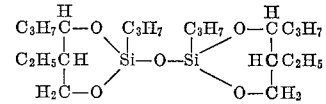

at 155° C. at 0.5 mm. of mercury pressure. The compound had a refractive index of $n_D{}^{25.8}$ 1.4475. Elemental analysis of the compound showed 59.5% carbon, 10.3% hydrogen and 12.2% silicon as compared to theoretical values of 59.2% carbon, 10.3% hydrogen and 12.59% silicon.

Example 6

The viscosities of the compounds prepared in the previous examples were measured at various temperatures and are set forth in the table below. This data is of value when the compounds are to be used as hydraulic fluids.

| Compound of | Viscosity (centistokes) | | | |
|---|---|---|---|---|
| | 25° C. | 75° C. | 125° C. | 200° C. |
| Example 1 | 61.8 | 8.79 | 3.14 | 1.23 |
| Example 2 | 66.2 | 7.76 | 2.59 | 1.06 |
| Example 3 | 95.1 | 11.9 | 3.89 | 1.44 |
| Example 4 | 7.75 | 26.5 | 60.1 | 1.88 |
| Example 5 | 20.6 | 4.36 | 1.82 | 0.79 |

Example 7

The compounds of Examples 1–5 were evaluated as insect repellents using the black sock test. It was found that in a particular swampy area that about 10 mosquitoes per minute would land on a bare, exposed hand and attempt to bite. When a plain black cotton sock is placed over the hand about 7 to 8 mosquitoes per minute land. When socks treated with the leading commercial insect (mosquito) repellents, "6·12" (2-ethylhexane-1,3-diol) and "OFF," are placed over the hand about 1 to 2 mosquitoes per minute land. It was found that when socks treated with the compounds of Examples 1–5 are placed over the hand, about 1 to 2 mosquitoes per minute land.

Example 8

When the aliphatic diols specified below are substituted for the 2-ethylhexane-1,3-diol in Example 2, the indicated products are obtained.

| Diol | Product |
|---|---|
| (A) (CH₃)₂C—OH<br>(CH₃)₂C—OH | [structure] |
| (B) (CF₃)₂C—OH<br>(CF₃)₂C—OH | [structure] |

| Diol | Product |
|---|---|
| (C) $(C_6H_5)_2\overset{}{C}-OH$ $(C_6H_5)_2\overset{}{C}-OH$ | $(C_6H_5)_2C-O\underset{(C_6H_5)_2C-O}{\overset{CH_3}{\underset{|}{\overset{|}{Si}}}}-O\underset{(C_6H_5)_2}{\overset{}{C}}-\underset{(C_6H_5)_2}{\overset{}{C}}O-\underset{O-C(C_6H_5)_2}{\overset{CH_3}{\underset{|}{\overset{|}{Si}}}}\overset{O-C(C_6H_5)_2}{}$ |
| (D) $C_6H_{11}\overset{H}{\underset{|}{C}}-OH$ $C_6H_{11}\overset{H}{\underset{|}{C}}-OH$ | $C_6H_{11}\overset{H}{\underset{|}{C}}-O\underset{C_6H_{11}\overset{H}{\underset{|}{C}}-O}{\overset{CH_3}{\underset{|}{\overset{|}{Si}}}}-O\underset{C_6H_{11}}{\overset{}{C}}H\underset{C_6H_{11}}{\overset{}{C}}HO-\underset{O-\overset{}{C}C_6H_{11}}{\overset{CH_3}{\underset{|}{\overset{|}{Si}}}}\overset{O-\overset{H}{\underset{|}{C}}C_6H_{11}}{}$ |
| (E) $CH_3\overset{H}{\underset{|}{C}}-OH$ $\underset{|}{CH_2}$ $\underset{|}{CH_2}$ $CH_3\overset{H}{\underset{|}{C}}-OH$ | $\underset{CH_3\overset{}{\underset{|}{C}}-O}{\overset{CH_3C-O}{\underset{H_2C}{\overset{H_2C}{}}}}\overset{CH_3}{\underset{|}{\overset{|}{Si}}}-OCHCH_2CH_2CHO-\underset{CH_3}{\overset{CH_3}{}}\overset{CH_3}{\underset{|}{\overset{|}{Si}}}\overset{O-\overset{H}{\underset{|}{C}}CH_3}{\underset{\underset{CCH_3}{CH_2}}{CH_2}}$ |
| (F) $H_2\overset{}{C}-OH$ $C_4H_9-\overset{}{\underset{|}{C}}-C_2H_5$ $H_2\overset{}{C}-OH$ | $\underset{H_2\overset{}{C}-O}{\overset{H_2C-O}{C_4H_9\overset{}{C}C_2H_5}}\overset{CH_3}{\underset{|}{\overset{|}{Si}}}-OCH_2\overset{C_2H_5}{\underset{C_4H_9}{\overset{|}{C}}}CH_2O-\overset{CH_3}{\underset{|}{\overset{|}{Si}}}\overset{O-CH_2}{\underset{O-CH_2}{C_2H_5C_4H_9}}$ |
| (G) $H_2\overset{}{C}-OH$ $(CH_3)_2\overset{}{C}$ $(CH_3)_2CH\overset{}{C}-OH$ | $\underset{(CH_3)_2CH\overset{}{C}-O}{\overset{H_2C-O}{(CH_3)_2\overset{}{C}}}\overset{CH_3}{\underset{|}{\overset{|}{Si}}}-OCH_2\overset{(CH_3)_2}{\underset{CH(CH_3)_2}{\overset{|}{C}}}CHO-\overset{CH_3}{\underset{|}{\overset{|}{Si}}}\overset{O-CH_2}{\underset{O-\overset{H}{\underset{|}{C}}CH(CH_3)_2}{\overset{}{C}(CH_3)_2}}$ |

Example 9

When two mols of the intermediate product of Example 5,

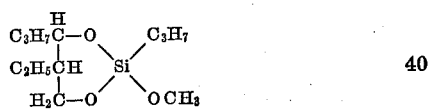

is reacted with one mol of the siloxanes specified below, the indicated product is obtained.

| Siloxane | Product |
|---|---|
| (A) HO[(CH$_3$)$_2$SiO]$_{12}$H | $\underset{H_2\overset{}{C}-O}{\overset{C_3H_7\overset{H}{\underset{|}{C}}-O}{C_2H_5CH}}\overset{C_3H_7}{\underset{|}{Si}}O-[(CH_3)_2SiO]_{12}-\overset{C_3H_7}{\underset{|}{Si}}\overset{O-\overset{H}{\underset{|}{C}}C_3H_7}{\underset{O-CH_2}{H\overset{}{C}C_2H_5}}$ |
| (B) HO[CF$_3$CH$_2$CH$_2$(CH$_3$)SiO]$_{50}$H | $\underset{H_2\overset{}{C}-O}{\overset{C_3H_7\overset{H}{\underset{|}{C}}-O}{C_2H_5CH}}\overset{C_3H_7}{\underset{|}{Si}}O-[CF_3CH_2CH_2(CH_3)SiO]_{50}\overset{C_3H_7}{\underset{|}{Si}}\overset{O-\overset{H}{\underset{|}{C}}C_3H_7}{\underset{O-CH_2}{H\overset{}{C}C_2H_5}}$ |
| (C) CH$_3$O[(CH$_3$)$_2$SiO]$_{750}$CH$_3$ | $\underset{H_2\overset{}{C}-O}{\overset{C_3H_7\overset{H}{\underset{|}{C}}-O}{C_2H_5CH}}\overset{C_3H_7}{\underset{|}{Si}}O-[(CH_3)_2SiO]_{750}-\overset{C_3H_7}{\underset{|}{Si}}\overset{O-\overset{H}{\underset{|}{C}}C_3H_7}{\underset{O-CH_2}{H\overset{}{C}C_2H_5}}$ |
| (D) C$_3$H$_7$O[C$_6$H$_5$(CH$_3$)SiO]$_{250}$[(CH$_3$)$_2$SiO]$_{750}$C$_3$H$_7$ | $\underset{H_2\overset{}{C}-O}{\overset{C_3H_7\overset{H}{\underset{|}{C}}-O}{C_2H_5CH}}\overset{C_3H_7}{\underset{|}{Si}}O[C_6H_5(CH_3)SiO_{250}[(CH_3)_2SiO]_{750}-\overset{C_3H_7}{\underset{|}{Si}}\overset{O-\overset{H}{\underset{|}{C}}C_3H_7}{\underset{O-CH_2}{H\overset{}{C}C_2H_5}}$ |
| (E) C$_2$H$_5$O[C$_2$H$_5$(CH$_3$)SiO]$_{10,000}$C$_2$H$_5$ | $\underset{H_2\overset{}{C}-O}{\overset{C_3H_7\overset{H}{\underset{|}{C}}-O}{C_2H_5CH}}\overset{C_3H_7}{\underset{|}{Si}}O-[C_2H_5(CH_3)SiO]_{10,000}-\overset{C_3H_7}{\underset{|}{Si}}\overset{O-\overset{H}{\underset{|}{C}}C_3H_7}{\underset{O-CH_2}{H\overset{}{C}C_2H_5}}$ |

Example 10

When the compounds specified below are substituted for the intermediate product used in Example 9, the corresponding products are obtained.

(A)
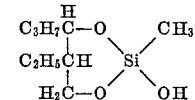

(B)
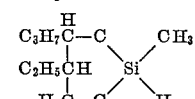

(C)
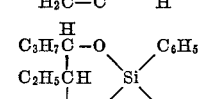

(D)
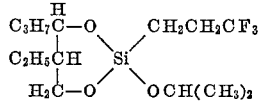

Example 11

To a solution of 30 g. of propylsilsesquioxane in 63 g. of toluene there was added 46.1 g. of 2-ethylhexane-1,3-diol and 0.5 g. of potassium hydroxide, and then the resulting mixture heated at 100° C. for about one hour. Then the toluene and water were azeotroped off at 78° C., and then the reactants heated several more hours at 250°–300° C. About 5.1 g. of water was distilled out. About 43.3 g. of

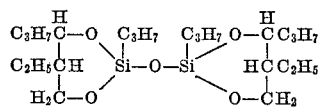

was obtained at 154° C. at 0.35 mm. of mercury pressure.

That which is claimed is:

1. A heterocyclic silicon compound selected from the group consisting of those having the general formulae (1)
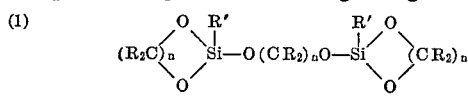

and (2)
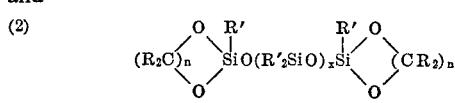

wherein

R is a hydrogen atom, a hydrocarbon radical or a halohydrocarbon radical, at least two of the R radicals in each ring being hpdrocarbon or halohydrocarbon radicals and every R being free of aliphatic unsaturation, R' is a hydrocarbon radical or a halohydrocarbon radical, n has a value of from 2 to 5, and x is an integer.

2. A compound as defined in claim 1 which has Formula 1.

3. A compound as defined in claim 2 wherein at least two of the R groups where R is a hydrocarbon or halohydrocarbon radical in each ring are located vicinally.

4. A compound as defined in claim 3 wherein R and R' contain from 1 to 6 carbon atoms and n has a value of from 3 to 4.

5. A compound as defined in claim 4 which has the formula

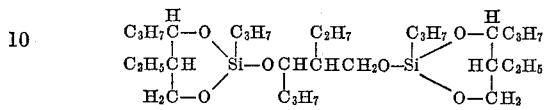

6. A compound as defined in claim 4 which has the formula

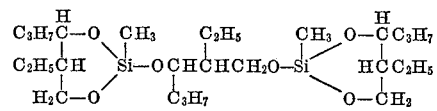

7. A compound as defined in claim 4 which has the formula

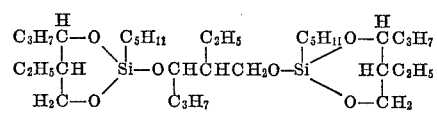

8. A compound as defined in claim 4 which has the formula

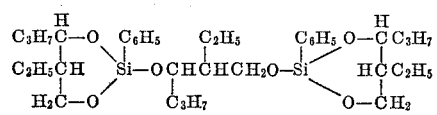

9. A compound as defined in claim 1 which has Formula 2.

10. A compound as defined in claim 9 wherein at least two of the R groups where R is a hydrocarbon or halohydrocarbon radical in each ring are located vicinally.

11. A compound as defined in claim 10 wherein R and R' contain from 1 to 6 carbon atoms, n has a value of from 3 to 4, and x has a value from 0 to about 1000.

12. A compound as defined in claim 11 which has the formula

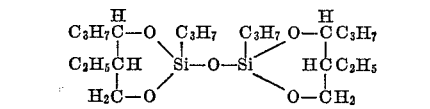

References Cited

UNITED STATES PATENTS

| | | | |
|---|---|---|---|
| 3,065,254 | 11/1962 | Silva | 260—448.8 |
| 3,078,293 | 2/1963 | Ender | 260—448.8 |
| 3,256,308 | 6/1966 | Sterling et al. | 260—448.8 |
| 3,337,598 | 8/1967 | Sterling et al. | 260—448.8 |

TOBIAS E. LEVOW, Primary Examiner

P. F. SHAVER, Assistant Examiner

U.S. Cl. X.R.

252—49.6, 78